United States Patent
Cerón Garcia et al.

(10) Patent No.: US 9,073,275 B2
(45) Date of Patent: Jul. 7, 2015

(54) MOLDING BENCH FOR CURVING MIRRORS

(75) Inventors: Francisco Cerón Garcia, Seville (ES); Joaquin Del Rio Martin, Seville (ES); Antonio Esteban Garmendia, Seville (ES); Valerio Fernandez Quero, Seville (ES)

(73) Assignee: Abengoa Solar New Technologies, S.A., Seville (ES)

( * ) Notice: Subject to any disclaimer, the term of this patent is extended or adjusted under 35 U.S.C. 154(b) by 416 days.

(21) Appl. No.: 13/509,435

(22) PCT Filed: Nov. 11, 2010

(86) PCT No.: PCT/ES2010/000457
§ 371 (c)(1),
(2), (4) Date: Jul. 25, 2012

(87) PCT Pub. No.: WO2011/098624
PCT Pub. Date: Aug. 18, 2011

(65) Prior Publication Data
US 2012/0282363 A1    Nov. 8, 2012

(30) Foreign Application Priority Data
Nov. 12, 2009   (ES) .................................. 200902159

(51) Int. Cl.
*C03B 23/035* (2006.01)
*B29C 51/10* (2006.01)
(Continued)

(52) U.S. Cl.
CPC ........... *B29D 11/00596* (2013.01); *B28B 17/00* (2013.01); *B29C 51/10* (2013.01); *C03B 23/0357* (2013.01); *F24J 2/1057* (2013.01)

(58) Field of Classification Search
CPC  C03B 23/035; C03B 23/0357; C03B 35/243; B25B 11/005; B29D 11/00596; B28B 17/00; B29C 51/10
USPC ............. 65/25.1–25.4, 102, 106, 182.2, 268, 65/273, 289, 113; 269/21, 266, 304; 425/150, 195, 387.1, 388, 396, 404, 425/405.1, 445, 446, DIG. 60, 397, 466, 425/DIG. 102, DIG. 105, DIG. 107
See application file for complete search history.

(56) References Cited

U.S. PATENT DOCUMENTS 2,729,040 A * 1/1956 Wallace et al. ................ 451/388
3,158,381 A * 11/1964 Yamamura ......................... 279/3
(Continued)

FOREIGN PATENT DOCUMENTS

DE       102007031579 A1 * 11/2008 ............... B23Q 3/08
EP       0 761 391 B1 * 2/1999 ............... B25B 11/00
(Continued)

OTHER PUBLICATIONS

IPRP/WO for related PCT/ES2010/000457 issued on May 15, 2012 / May 9, 2011, and its English translation.
(Continued)

*Primary Examiner* — Dimple Bodawala
(74) *Attorney, Agent, or Firm* — Kilpatrick Townsend & Stockton LLP

(57) ABSTRACT

Molding bench for curving mirrors comprising a sheet (1) supported on a frame by means of a joint system that prevents the sheet (1) from shifting and moving and to the lower part of which are fixed a series of air pipes (14) having a general air header pipe (3) connected to a vacuum pump. The sheet (1) consists of a square lattice the intersections of which have perforations that match up with a series of suction points of the air pipes (14), intended to produce a vacuum in the bench and which have been previously calibrated, such that said bench can be used to manufacture mirrors having any curvature.

10 Claims, 4 Drawing Sheets

(51) Int. Cl.
    *B28B 17/00*      (2006.01)
    *B29D 11/00*      (2006.01)
    *F24J 2/10*      (2006.01)

(56) References Cited

U.S. PATENT DOCUMENTS

| | | | | |
|---|---|---|---|---|
| 3,223,443 | A * | 12/1965 | Misson | 294/65 |
| 3,682,613 | A * | 8/1972 | Johnson et al. | 65/289 |
| 4,420,362 | A * | 12/1983 | Valimont et al. | 156/563 |
| 4,501,603 | A * | 2/1985 | Frank et al. | 65/106 |
| 4,508,556 | A * | 4/1985 | Bennett et al. | 65/25.4 |
| 4,714,489 | A * | 12/1987 | Bennett et al. | 65/104 |
| 4,781,870 | A | 11/1988 | Talbert | |
| 5,059,233 | A * | 10/1991 | Miihkinen et al. | 65/104 |
| 5,139,245 | A * | 8/1992 | Bruns et al. | 269/21 |
| 5,173,148 | A * | 12/1992 | Lisec | 156/578 |
| 5,266,021 | A * | 11/1993 | Jacobson | 425/334 |
| 5,411,617 | A | 5/1995 | La Fiandra | |
| 5,572,786 | A * | 11/1996 | Rensch | 29/559 |
| 5,695,538 | A * | 12/1997 | Goolsbay et al. | 65/106 |
| 6,024,631 | A * | 2/2000 | Piper | 451/41 |
| 6,189,876 | B1 * | 2/2001 | Frazier | 269/21 |
| 6,250,619 | B1 * | 6/2001 | Cook et al. | 269/20 |
| 8,057,206 | B1 * | 11/2011 | McKnight | 425/89 |
| 2006/0261533 | A1* | 11/2006 | Freeland | 269/266 |
| 2007/0158031 | A1* | 7/2007 | Miyake | 156/581 |
| 2009/0252581 | A1* | 10/2009 | Mischler et al. | 414/222.05 |
| 2009/0322008 | A1* | 12/2009 | Freeland | 269/296 |
| 2011/0302964 | A1* | 12/2011 | Nitschke et al. | 65/106 |
| 2013/0025114 | A1* | 1/2013 | Mizubata | 29/559 |

FOREIGN PATENT DOCUMENTS

| | | | | |
|---|---|---|---|---|
| EP | 1987923 A3 * | 9/2010 | | B25B 11/00 |
| GB | 2158388 | 11/1985 | | |
| JP | 62018241 A * | 1/1987 | | B29C 51/18 |
| WO | WO 2010061238 A1 * | 6/2010 | | C03B 23/035 |

OTHER PUBLICATIONS

ISR for related PCT/ES2010/000457 mailed on May 9, 2011; and its English translation.

* cited by examiner

MOLDING BENCH FOR CURVING MIRRORS

CROSS-REFERENCE TO RELATED APPLICATIONS

This application is the U.S. National Stage of International Patent Application No. PCT/ES2010/000457 filed on Nov. 11, 2010, which claims priority to Spanish Patent Application No. P200902159 filed on Nov. 12, 2009, the disclosures of which are hereby incorporated by reference in their entireties.

TECHNICAL FIELD OF THE INVENTION

The invention falls within the technology of curving of mirror-type flat surfaces having its main application in the sector of solar energy, more specifically, in the manufacture of the heliostats to be used as solar radiation concentrators.

BACKGROUND OF THE INVENTION

The general principle of solar thermal technology is based on the concept of the concentration of solar radiation to heat a heat-transfer fluid and generate electricity. Solar energy collection and its concentration is one of the greatest challenges in the development of solar thermal power plants. There are mainly two types of solar concentrators: linear concentrators and point concentrators.

Within point concentrators parabolic disc and tower central concentrators can be distinguished. Within linear technology, the Parabolic Cylinder Concentrator (PCC) is the more mature concentration system and now the new Fresnel-type Linear Concentrators (FLC) are starting to emerge.

In the case of the Fresnel technology plants, these are composed of a primary and a secondary system. The primary system consists of a series of parallel rows of flat or slightly curved reflecting mirrors, with mobile structures that are responsible for emitting and guiding solar radiation to the secondary system.

The mirrors of the Fresnel primary field should refocus the light in the secondary. To optimize solar concentration and that the rays enter into the secondary reconcentrator it is necessary to curve the mirrors.

In the case of the tower plants, the mirrors or heliostats reflect all the solar radiation on a point or focus located at the top of a tower, which is why these mirrors are also curved, with the purpose of concentrating all the solar radiation on said focus.

This type of facilities should be very cheap in order to be competitive. Therefore, buying flat primary mirrors and then mechanically curving them before mounting the rows of the primary is cheaper that buying the directly curved mirrors.

In general, the known state of the art works the idea of creating a mold for each desired curvature, with the increase of costs and the lack of precision that this entails, because it is so expensive to create a mold for each curvature required in the field that the aim is to homogenize the manufacture, at the expense of losing quality and efficiency in the system.

Therefore, the solution proposed by the invention passes by having a single mirror curving bench which allows curving the mirrors with any desired curvature, without having to make a mold for each development.

The filed invention enables carrying out this task.

DESCRIPTION OF THE INVENTION

The invention consists of a molding bench of mirrors for later use as heliostats in solar tower plants or primary mirrors in Fresnel-type solar plants.

It is a bench that is able to provide to each mirror the precise curvature, something very necessary because in the same solar plant are required heliostats with different type of curvature, depending on where they are going to be installed. That is why it is little operative to use a different bench or mold for each type of curvature, as it has been done until now, being much more efficient to be able to make them all in the same molding bench.

To this end, the bench is calibrated by means of a series of millimetric targets for having the dimensions at which each point of the mirror should be located and that, thanks to a vacuum system, the mirror stays attached to said bench the precise time so that it acquires the appropriate curvature.

Basically, the bench consists of a flat surface or sheet that has a series of drills through which the suction is carried out to achieve the previously mentioned vacuum.

Underneath the sheet lies a network of air pipes that are connected to a vacuum pump at its end and a frame, which is responsible for supporting all the assembly. Next, with the help of the installation planes, the invention will be described in detail.

DESCRIPTION OF THE DRAWINGS

To complete the description that is being carried out and in order to help to a better understanding of the invention, it is accompanied by a set of drawings where, with an illustrative character and without limitation, the following has been represented.

DETAILED DESCRIPTION OF THE INVENTION

Next and with illustrative character and without limitation, a detailed description of the molding bench of mirrors of the invention is set forth.

Figure 1:
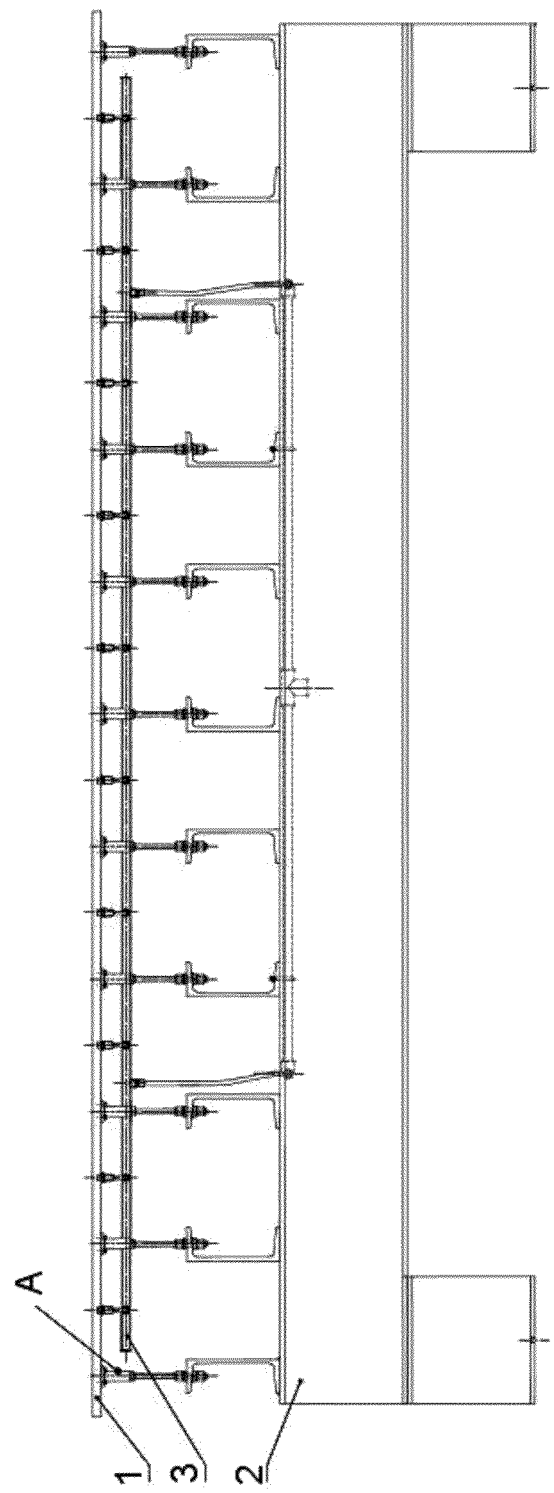
FIG. 1: Elevational view of the molding bench

As it appears in FIG. 1, which represents an elevational view of the bench of the invention, the bench is basically composed of a sheet (1) to the lower part of which are fixed a series of air pipes with general air header pipe (3), all this resting on a frame (2).

Figure 4:
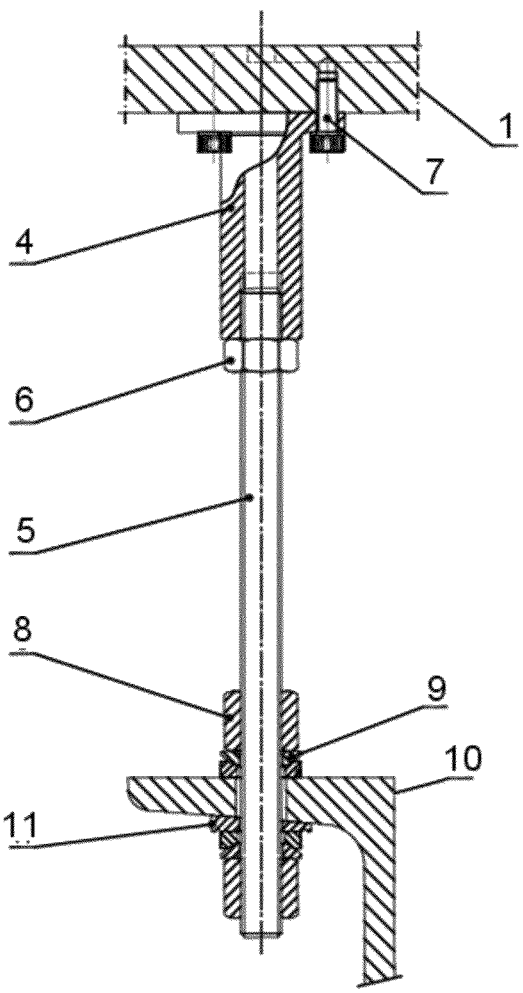
FIG. 4: Detail "A" of FIG. 1
FIG. 5: Detail "B" of FIG. 3
FIG. 6: Detail "C" of FIG. 3

The sheet (1) supports itself on the frame by attachment pieces the detail of which is shown in FIG. 4 and which is explained below.

Figure 2:
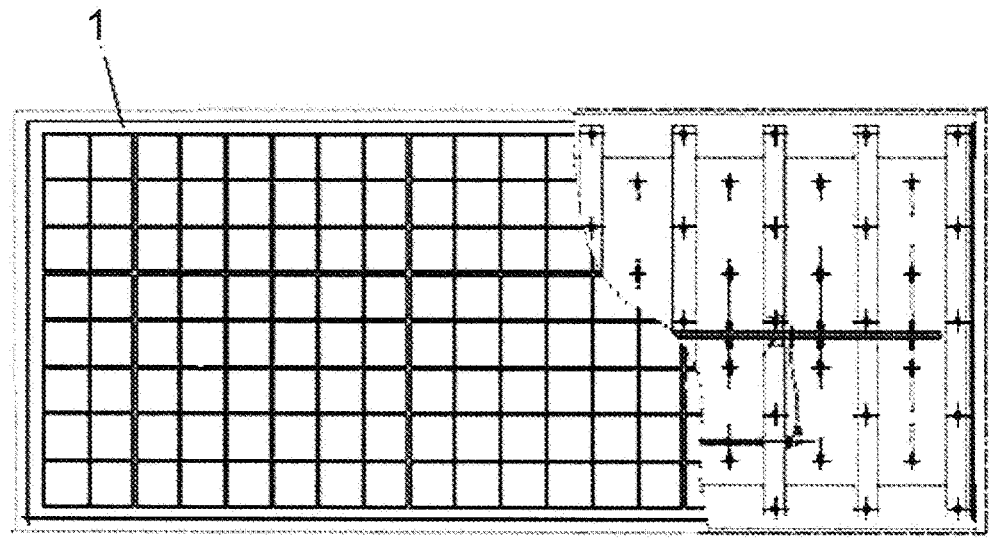
FIG. 2: Plant view of the molding bench

FIG. 2 represents a plant view of the bench. It can be observed in it how the sheet (1) consists of a grid lattice with perforations at the intersection points of said lattice, that match up with a series of suction points of the different air pipes (14) that are located below the sheet.

Figure 3:
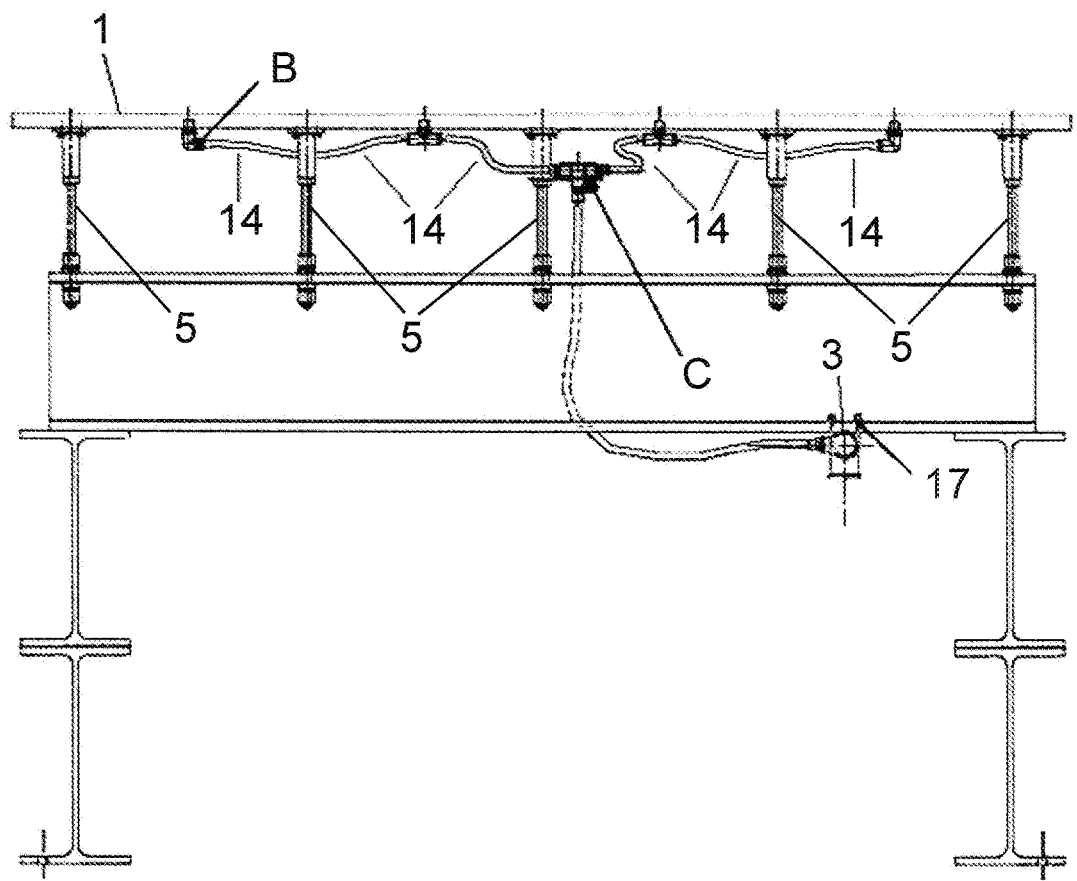
FIG. 3: Profile of the molding bench

As it can be seen in FIG. 3, said air pipes (14) are placed perpendicular to the general air header pipe (3). These pipes (14) can be manufactured in polyurethane or any equivalent material. All of them are interconnected and will go to a general pipe or general collector pipe (3), which continues its route to the suction pump (not shown), being supported to the frame (2) on its course by a strut for pipe (17).

The different suction points will have been previously calibrated by means of a series of millimetric targets to have the dimensions to be achieved by each point of the mirror so that the mirror is attached to said bench taking the suitable curvature in each case.

In this way, the manufacture of all kinds of mirrors with all kinds of curvatures with a single bench is achieved, not having to make a mold for each different curvature that you want to achieve, as is the case with the systems used until now.

In FIG. 4 appears the detail "A" of FIG. 1, corresponding to the joint and fastening system between the sheet (1) and the frame (2). It basically consists of a tensor (5) which is fixed to an anchoring piece (4) screwed (7) to the sheet (1) through a nut (6). Said tensor (5) is attached to a supporting piece (10) with a lug (8), and washers (9, 11) all the way to the frame (2). This support system will be installed repeatedly throughout the frame (2), thus avoiding any kind of flexion and movement of the sheet (1), which is very important due to the minimum tolerances that are accepted to achieve the exact curvature of the mirror.

Figure 5:
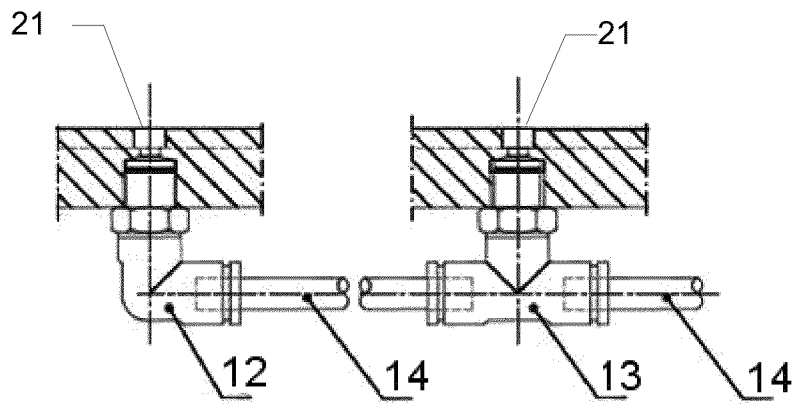

FIG. 5 shows detail "B" of FIG. 3 which corresponds to the connections between the air pipes (14) as well as with the suction points (21). The pipes located at the sides of the bench carry out the connection by means of elbows (12) while the intermediate 5 use "T" (13).

Figure 6:
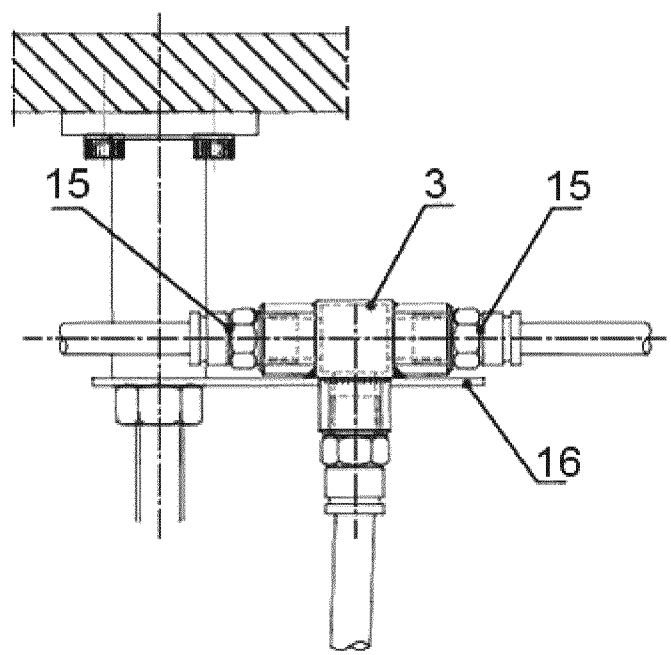

FIG. 6 shows detail "C" also of FIG. 3 where it is reflected how the binding of the pipes (14) with the collector pipe (3) is carried out making use of input fittings (15) and a supporting plate of the assembly (16).

The molding bench described in the invention has its main application in the manufacture of curved mirrors for solar concentrators, not discarding that it can be used in any application requiring the curving of flat surfaces.

The invention claimed is:

1. A molding bench for curving a plurality of mirrors having different curvatures, the molding bench comprising:
   a sheet supported on a frame the sheet having a lower part to which is fixed a series of air pipes connected to a vacuum pump;
   wherein the sheet comprises a square lattice with intersections, the intersections having perforations, the perforations being functionally connected to the series of air pipes to create a series of suction points at the perforations; and
   a series of tensors functionally connected to the sheet and the frame, wherein the series of tensors are configured to adjust a series of distances between the sheet and the frame;
   wherein the suction points are dimensionally calibratable by adjustment of the series of distances between the sheet and the frame using the series of tensors to have the dimensions to be achieved at each point of a first mirror having a first curvature, and are further dimensionally calibratable to have the dimensions to be achieved at each point of a second mirror having a second curvature different from the first curvature.

2. The molding bench of claim 1, wherein the series of air pipes are connected to the vacuum pump through a general air header pipe, and the general air header pipe is supported by a strut attached to the frame.

3. The molding bench of claim 1, wherein each tensor is fixed through a lug to an anchoring piece screwed to the sheet, and wherein each tensor is fixed to a supporting piece with a lug and washers all the way to the frame.

4. The molding bench of claim 1, further comprising first joints between the series of air pipes and the suction points, and the first joints include elbows or tees.

5. The molding bench of claim 4, wherein the series of air pipes are connected to the vacuum pump through a general air header pipe, the molding bench further comprising second joints between the series of air pipes and the general air header pipe, and the each of the second joints includes an input fitting and a supporting plate.

6. The molding bench of claim 1, wherein the bench is dimensionally calibratable to the dimensions of a mirror to be produced by adjustment of a series of distances between the sheet and the frame at points between the suction points.

7. The molding bench of claim 2, wherein the series of air pipes are connected to the general air header pipe at right angles.

8. The molding bench of claim 1, wherein the series of air pipes are interconnected to one another.

9. The molding bench of claim 1, wherein the series of tensors are connected to the sheet at locations between the suction points.

10. A molding bench for curving a plurality of mirrors having different curvatures, the molding bench comprising:
    a sheet supported on a frame the sheet having a series of suction points distributed on a face of the sheet, the face of the sheet configured to interface with the plurality of mirrors having different curvature; and
    a series of tensors functionally connected to the sheet and the frame, wherein the series of tensors are configured to adjust a series of distances between the sheet and the frame;
    wherein the suctions points are positionally adjustable in relation to the frame by adjustment of the series of distances between the sheet and the frame using the series of tensors to have the dimensions to be achieved at each point of a first mirror having a first curvature, and are further positionally adjustable to have the dimensions to be achieved at each point of a second mirror having a second curvature different from the first curvature.

* * * * *